(12) United States Patent
Achard et al.

(10) Patent No.: US 8,123,482 B2
(45) Date of Patent: Feb. 28, 2012

(54) DEVICE FOR MAINTAINING A HYDRAULIC TURBOMACHINE

(75) Inventors: Jean-Luc Achard, Grenoble (FR); Didier Imbault, Meylan (FR); Thierry Maitre, Saint Ismier (FR)

(73) Assignees: Institut polytechnique de Grenoble, Grenoble (FR); Electricite de France, Paris (FR)

( * ) Notice: Subject to any disclaimer, the term of this patent is extended or adjusted under 35 U.S.C. 154(b) by 852 days.

(21) Appl. No.: 11/884,320

(22) PCT Filed: Feb. 14, 2006

(86) PCT No.: PCT/FR2006/050135
§ 371 (c)(1),
(2), (4) Date: Aug. 28, 2008

(87) PCT Pub. No.: WO2006/085042
PCT Pub. Date: Aug. 17, 2006

(65) Prior Publication Data
US 2009/0129923 A1    May 21, 2009

(30) Foreign Application Priority Data
Feb. 14, 2005    (FR) ...................................... 05 50420

(51) Int. Cl.
  B63H 5/08    (2006.01)
  B63B 1/28    (2006.01)
  F03D 7/02    (2006.01)
  F03D 7/06    (2006.01)
  F03D 7/00    (2006.01)
  F03D 13/00   (2006.01)
  F01D 11/00   (2006.01)

(52) U.S. Cl. ...................... 416/120; 416/244 R; 415/4.4; 415/122.1

(58) Field of Classification Search .................... 415/60, 415/61, 65, 66, 7, 8, 4.1, 4.2, 4.4, 122.1, 415/124.1, 124.2, 123, 110, 116, 117; 416/1, 416/41, 244 R, 132 B, 120
See application file for complete search history.

(56) References Cited

U.S. PATENT DOCUMENTS
1,782,277 A    11/1930    Smith
(Continued)

FOREIGN PATENT DOCUMENTS
DE    36 39 989    6/1988
(Continued)

OTHER PUBLICATIONS
International Search Report dated Jun. 2, 2006.
(Continued)

*Primary Examiner* — Thomas L Dickey
*Assistant Examiner* — Nikolay Yushin
(74) *Attorney, Agent, or Firm* — Howard IP Law Group, PC (57) ABSTRACT

A device for holding a hydraulic turbomachine in position, the turbomachine comprising a drive shaft along which are distributed turbines designed to rotate the drive shaft when they are immersed in a moving liquid, each turbine comprising drive blades distributed around the drive shaft, the device comprising at least one post extending along at least more than half of the length of the drive shaft and formed of the stacking of at least two post portions, each post portion being associated with a turbine or with an assembly of adjacent turbines; and a first linking mechanism attached to one of the post portions and to a bearing receiving the drive shaft and arranged between two adjacent turbines; and a second linking mechanism connecting at least one of the posts to the around by a rigid connection with respect to the ground along at least one axis parallel to the liquid motion direction.

19 Claims, 9 Drawing Sheets

U.S. PATENT DOCUMENTS

| | | | |
|---|---|---|---|
| 3,922,012 A * | 11/1975 | Herz | 290/43 |
| 4,060,344 A * | 11/1977 | Ootsu | 417/330 |
| 4,134,707 A | 1/1979 | Ewers | |
| 6,808,366 B2 * | 10/2004 | Sikes | 416/1 |
| 2001/0001299 A1 | 5/2001 | Gorlov | |
| 2002/0197148 A1 | 12/2002 | Belinsky | |
| 2004/0061337 A1 * | 4/2004 | Becker | 290/44 |
| 2004/0120805 A1 * | 6/2004 | Lin | 415/122.1 |
| 2005/0244271 A1 * | 11/2005 | Kinpara et al. | 416/132 B |

FOREIGN PATENT DOCUMENTS

| | | | |
|---|---|---|---|
| FR | 2 821 647 | | 9/2002 |
| GB | 118899 | | 9/1918 |
| WO | WO 01/92720 | | 12/2001 |
| WO | WO03/067079 | * | 8/2003 |
| WO | WO 2005/010353 | | 2/2005 |
| WO | WO 2005/075819 | | 8/2005 |

OTHER PUBLICATIONS

Alexander M. Gorlov. (Jul. 1998). Helical Turbines for the Gulf Stream: Conceptual Approach to Design of a Large-Scale Floating Power Farm. Marine Technology, vol. 35, No. 3, pp. 175-182.

* cited by examiner

DEVICE FOR MAINTAINING A HYDRAULIC TURBOMACHINE

This application claims the benefit of French Application No. 05/50420, filed Feb. 14, 2005 and Int'l. Application No. PCT/FR2006/050135, filed Feb. 14, 2006, the entire disclosures of which are incorporated herein by reference.

FIELD OF THE INVENTION

The present invention relates to a device for holding in position a hydraulic turbomachine, in particular a hydraulic turbomachine for supplying electricity by recovery of the energy of marine or river currents.

DISCUSSION OF PRIOR ART

Among natural non-polluting energy sources, a currently rather unexploited energy source corresponds to water currents naturally present on our planet: high sea currents, tidal currents, strait and estuary currents, stream or river currents. Indeed, whilst hydroelectric power plants providing electric energy from the potential energy contained in a pondage (for example, dams on streams or rivers) are widespread, devices supplying electric energy directly from the kinetic energy of marine or river currents are generally still currently at the stage of projects and most often correspond to hydraulic turbo-machines with a horizontal axis.

Even though sites which could be used for the supply of electric energy from marine or river currents generally correspond to currents of low velocity, from 0.5 m/s to 6 m/s, the size of the sites and the large number of potential sites make such an energy source particularly attractive. Indeed, from rivers to large ocean currents, the exploitable surface areas crossed by a current typically vary from 100 $m^2$ to 100 $km^2$, which corresponds, for a 2-m/s velocity, to respective theoretically recoverable powers from 400 kilowatts to 400 gigawatts.

Publication "Helical Turbines for the Gulf Stream: Conceptual Approach to Design of a Large-Scale Floating Power Farm" by Gorlov (Marine Technology, vol. 35, n°3, July 1998, pages 175-182) describes an electricity supply device comprising a group of columns arranged in a marine current and interconnected by a stiffening bar system. Each column is formed of a stacking of elementary turbines, called hereafter a turbine unit, along a vertical axis. An advantage of such a turbomachine is that the operation of the turbine units is independent from the orientation of the current, since variations in the current orientation are likely to be encountered, for example, in the case of marine currents. A turbine unit is formed of two parallel flanges between which are arranged at least two blades, each corresponding to a helicoid portion, the blade tips being connected to one of the flanges. In the column, the flanges of two adjacent turbine units are solidly attached. When crossed by a current, each turbine unit provides a drive torque to the column which, in turn, drives an electric generator.

Such a structure has several disadvantages. In a turbine unit, the drive torque is provided by the connection between the blades and the associated flanges and, in a column, the drive torque of the electric generator is transmitted from close to close between each turbine unit by the connections between the flanges of adjacent turbine units. Thereby, a breakage of a blade of a single turbine unit may cause the failure of the turbine unit. Further, the blades of a turbine unit receive a torsion torque transmitted by the underlying turbine units in the column. The blades of the turbine units close to the electric generator are thus the most stressed. To avoid breakage of the most stressed blades, turbine units which are more or less resistant according to their position in the column with respect to the electric generator may be provided. However, this complicates the column design and manufacturing. If it is desired to keep identical turbine units, it is necessary for each turbine unit to be able to resist the maximum torsion torque, which in practice amounts to providing sufficiently thick blades. In this case, the turbine units remote from the generator are oversized in thickness with respect to the torsion torque that they actually receive, which degrades the hydrodynamic performances of the column.

Further, the column group described in Gorlov's publication is completely immersed and anchored to the sea bottom. This column group gathers many columns interconnected by a lattice of a great number of bars. The installation cost of such a column group is very high. Further, the operations of maintenance of the column group must thus be performed by divers. The same applies for operations of modification of an already-installed column group corresponding, for example, to the retrieval or the addition of columns. Such operations are thus relatively expensive, technically difficult, and require for divers to take significant risks due to the marine current present at the column level.

French patent application 04/50209 of the applicant describes a hydraulic turbomachine comprising a drive shaft along which turbines are distributed. Each turbine comprises drive blades distributed around the drive shaft, each drive blade being shaped as a "V"-shaped sailwing with a free tip, having its central portion connected to the drive shaft by an arm, whereby the blades of a turbine receive no torsion torque from the adjacent turbines.

In the previously-described French patent application, examples of devices are described to provide the holding or stiffening of the turbomachine. As an example, the holding and the stiffening may be obtained by tensioning the drive shaft of the turbomachine along its axis by applying two axial forces of opposite direction to the ends of the drive shaft or to the ends of a cable running through the drive shaft along its axis. For this purpose, the upper end of the turbomachine may be held in position by a floating barge or float system and the lower end of the turbomachine may be ballasted, anchored to the ground or fastened at the level of a base, itself anchored to the ground.

However, the tension forces necessary for an efficient stiffening of the turbomachine drive shaft increase very rapidly along with the drive shaft length. The barges holding the upper end of the turbomachine must then provide a very strong lift, which imposes forming barges of very large dimensions. Further, mechanical stress that may be excessive may develop at the turbomachine drive shaft and at the devices for holding in position the ends of the turbomachine. It is accordingly difficult to avoid a strong bend of the drive shaft, which adversely affects a proper rotation of the turbomachine drive axis in the marine or river current.

Further, the use of barges holding in position the upper end of the turbomachine may be incompatible with the circulation of boats, in particular in the case where the turbomachine is arranged in a stream bed or in the presence of a strong swell. Indeed, in this last case, the system for anchoring the barge to the sea bottom, to a stream bed or to a bank, etc. may be under excessive stress and vertical oscillations of the barge may result in interactions which are difficult to control between the barge and the turbomachine.

SUMMARY OF THE INVENTION

The present invention aims at a device for holding in position a turbomachine, which does not necessarily require application of forces along the axis of the turbomachine drive shaft.

The present invention aims at a device for holding in position a turbomachine easing the turbomachine assembly, disassembly, and maintenance.

To achieve these objects, the present invention provides a device for holding a hydraulic turbomachine in position, the turbomachine comprising a drive shaft along which are distributed turbines designed to rotate the drive shaft when they are immersed in a moving liquid, each turbine comprising drive blades distributed around the drive shaft. The device comprises at least one post extending along at least more than half of the length of the drive shaft and formed of the stacking of at least two post portions, each post portion being associated with a turbine or with an assembly of adjacent turbines; first linking means attached to one of the post portions and to a bearing receiving the drive shaft and arranged between two adjacent turbines; and second linking means connecting at least one of the posts to the ground by a rigid connection with respect to the ground along at least one axis parallel to the liquid motion direction.

According to an embodiment of the present invention, the first linking means extend along a general direction perpendicular to the axis of the drive shaft.

According to an embodiment of the present invention, the device comprises, for each pair of adjacent turbines, first linking means attached to a post portion, associated with at least one of the turbines of the pair of adjacent turbines, and to a bearing receiving the drive shaft between the turbines of the pair of adjacent turbines.

According to an embodiment of the present invention, the device comprises at least two posts oriented along the axis of the drive shaft, each formed of the stacking of at least two post portions, each post portion being associated with a turbine or with an assembly of adjacent turbines, the linking means being attached to post portions of said two posts, associated with the same turbine or with the same assembly of adjacent turbines, and to said bearing.

According to an embodiment of the present invention, at least one post portion is surrounded with a stiffening sleeve having, in a plane perpendicular to the axis of the drive shaft, a wing profile to limit the drag.

According to an embodiment of the present invention, the device comprises guiding means running through the post, each post portion being capable of sliding along the guiding means in an operation of assembly or disassembly of the device.

According to an embodiment of the present invention, the device comprises at least three posts, each post being formed of the stacking of at least two post portions, each post portion being associated with a turbine or with an assembly of adjacent turbines, at least two posts being intended to be arranged upstream of the turbomachine according to the liquid flow direction and on either side of a plane containing the axis of the drive shaft and the liquid flow direction. The device comprises a grating attached between two post portions of said two posts associated with a same turbine or with a same assembly of adjacent turbines.

According to an embodiment of the present invention, the device comprises a platform to which is attached the upper end of the post along the direction of the axis of the drive shaft.

According to an embodiment of the present invention, the platform is immersed in the liquid.

According to an embodiment of the present invention, the device comprises at least three posts, each post being formed of the stacking of at least two post portions, each post portion being associated with a turbine or with an assembly of adjacent turbines, at least two posts being designed to be arranged upstream of the turbomachine along the liquid flow direction and on either side of a plane containing the axis of the drive shaft and the liquid flow direction. The device comprises at the level of each post portion among two post portions of said two posts, associated with a same turbine or with a same assembly of adjacent turbines, a conditioning device attached to said post portion or integrated with said post portion and capable of directing the liquid flow towards the turbomachine.

According to an embodiment of the present invention, the device comprises at least one hollow tank, attached to at least one post portion, said tank being empty or at least partly filled with liquid.

According to an embodiment of the present invention, the device comprises remotely-operable means capable, when the tank is immersed in the liquid, of at least partially filling the tank with liquid and/or of at least partially emptying the tank.

According to an embodiment of the present invention, the device comprises means for modifying the position of the post with respect to the turbomachine according to the liquid flow direction.

According to an embodiment of the present invention, the device comprises a speed variation system between a turbine, or a turbine assembly, and the drive shaft, capable of modifying the ratio between the rotation speed of the turbine or of the turbine assembly and the rotation speed of the drive shaft according to the liquid flow which reaches the turbine or the turbine assembly.

According to an embodiment of the present invention, the drive shaft drives an input shaft of an energy conversion system. The device comprises a speed variation system capable of modifying the ratio between the rotation speed of the drive shaft and the rotation speed of the input shaft according to the liquid flow which reaches the turbomachine.

According to an embodiment of the present invention, the drive shaft drives an input shaft of an energy conversion system, the energy conversion system being capable of providing a braking torque, which opposes to the rotation of the drive shaft, of an amplitude determined according to the liquid flow which reaches the turbomachine.

According to an embodiment of the present invention, the device comprises at least one ring-shaped stiffening element attached to the first linking means at the tips of the blades of one of the turbines.

According to an embodiment of the present invention, the stiffening element comprises a ring-shaped groove and at least one blade of a turbine comprises an element capable of sliding in said groove.

According to an embodiment of the present invention, the tips of the blades of at least one of the turbines are interconnected by a stiffening element which is fixed with respect to the turbine.

According to an embodiment of the present invention, the stiffening element comprises a ring-shaped groove and the tips of the blades of at least one of the turbines are interconnected by an additional ring-shaped stiffening element which is fixed with respect to the turbine and arranged at the groove level.

BRIEF DESCRIPTION OF THE DRAWINGS

The foregoing and other objects, features, and advantages of the present invention will be discussed in detail in the following non-limiting description of specific embodiments in connection with the accompanying drawings, among which.

DETAILED DESCRIPTION

For clarity, same elements have been designated with same reference numerals in the different drawings. In the rest of the disclosure, an elementary turbine forming a turbomachine will be called a turbine unit and a turbomachine formed of the stacking of several turbine units will be called a turbine column. Further, an element of a holding device according to the present invention designed to hold in position a turbine unit will be called a structure unit and a holding device formed of the stacking of several structure units and designed to hold a turbomachine in position will be called a tower or a holding tower.

Figure 1:
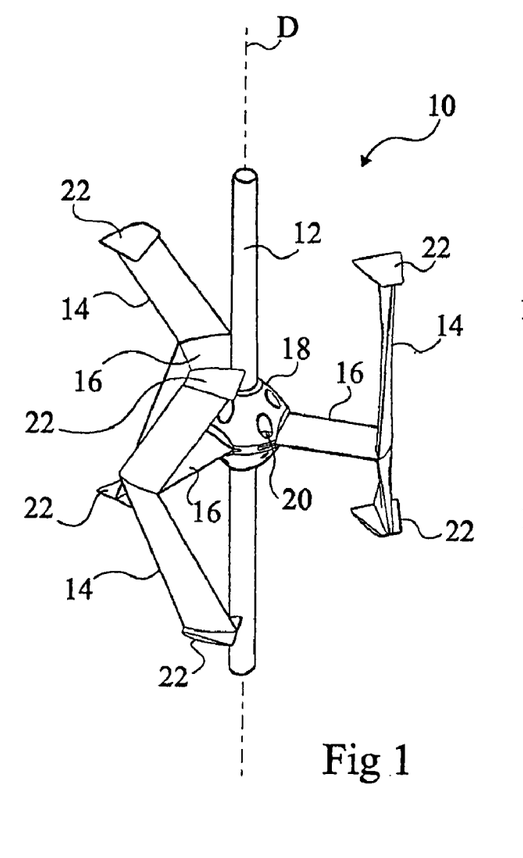
FIG. 1 shows an embodiment of a turbine.

FIG. 1 illustrates an embodiment of a turbine unit 10 based on which a turbine column can be formed. Turbine unit 10 comprises a drive shaft portion 12 of axis D capable of being rotated around axis D via drive blades 14 distributed around drive shaft portion 12. Each drive blade 14 is connected to drive shaft portion 12 via a rigid arm 16 substantially perpendicular to axis D and attached to a hub 18 moving along with drive shaft portion 12. Each drive blade 14 has a general V-shaped sailwing shape oriented so that the wing span, approximately varying from 1 to 10 meters, can be measured along axis D and having a cross-section, along a plane perpendicular to axis D, shaped as a wing profile with a skeleton corresponding to a portion of a circle, with a diameter approximately varying from 1 to 10 meters, and having its center on axis D. However, drive blades with a symmetrical profile may be used. As an example, the profile of a drive blade is a wing profile of the Naca or Eppler family. Each drive blade 14 is connected at its central portion to the associated rigid arm 16. The attachment of rigid arms 16 to hub 18 is ensured, for example, via screws 20. An end winglet 22 is provided at the tip edges of each drive blade 14 to limit hydrodynamic performance losses due to wind tip effects. End winglets 22 are generally oriented along a mean plane perpendicular to axis D or may have a slight angle of incidence with respect to such a mean plane. End winglets 22 may extend on either side of the tip edges of each drive blade or on a single side of the tip edges of each drive blade. Further, the tip edges of the end winglets may be curved in concentric circles. Moreover, end winglets 22 may also be delta wings, symmetrical or not.

The currents in which turbine unit 10 is designed to operate are generally slower than some ten meters per second. The rotation speeds of turbine unit 10 are thus relatively slow (typically slower than 300 revolutions per minute for a turbine unit 10 in which drive blades 14 are located approximately 1 meter away from drive shaft portion 12). This enables advantageously using drive blades 14 in the form of V-shaped sailwings, which could not be used at high rotation speeds, due to centrifugal forces. Drive blades 14 are shaped as symmetrical or slightly asymmetrical wings, which enables limiting, in operation, the development of a torsion torque at the level of arm 16 connecting drive blade 14 to drive shaft portion 12.

When turbine unit 10 is placed in a current having a direction perpendicular to axis D, drive blades 14 rotate shaft portion 12 around axis D. In the following description, it will be considered; unless otherwise mentioned, that the marine or river current has a direction substantially perpendicular to axis D. However, it should be clear that when the current has a direction inclined with respect to axis D by less then 90 degrees, drive blades 14 still rotate drive shaft portion 12 but with an efficiency which decreases as the flow direction draws away from the direction perpendicular to axis D.

For a constant current and for a given rotation speed, the drive torque provided by drive blades 14 of a turbine unit 10 mainly depends on the wing area of a drive blade 14 and on the number of drive blades 14. Thereby, for two turbine units having a different number of drive blades 14 to provide a same drive torque, the drive blades 14 of the turbine unit 10 having the smaller number of drive blades 14 must have a greater thickness and chord than the drive blades 14 of the turbine unit 10 having the greater number of drive blades 14. Such drive blades 14 are thus mechanically more resistant and are well adapted to strong currents, for example, on the order of 6 m/s. Conversely, the drive blades 14 of a turbine unit having a large number of blades may have a reduced thickness and chord with respect to the blades of a turbine unit having a smaller number of blades. This then enables decreasing the Reynolds number associated with the flow around each drive blade 14 and thus promoting the forming of a laminar flow to improve the turbine unit performances. Such a configuration is thus well adapted to low currents.

Figure 2:
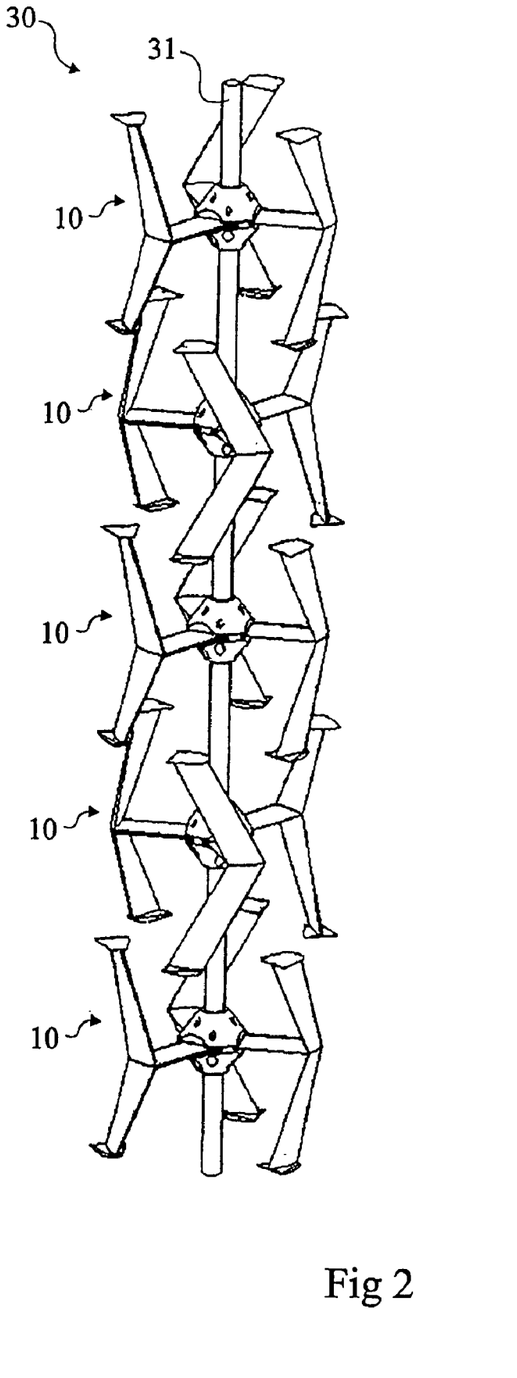
FIG. 2 shows an embodiment of a turbomachine formed of the stacking of five turbines shown in FIG. 1.

FIG. 2 schematically shows a partial embodiment of a turbine column 30 formed of a stacking of five turbine units 10 of FIG. 1 described in more detail in previously-mentioned patent application 04/50209. Drive shaft 31 of turbine column 30 is formed by the assembly of the drive shaft portions 12 of turbine units 10 which are firmly attached to all move along. Drive shaft 31 ensures the transmission of the drive torques provided by each turbine unit 10. Turbine column 30 drives an electric generator (not shown) at the level of one of the portions of drive shaft 31. The drive blades 14 of a turbine unit 10 are only connected to drive shaft portion 12 and are not directly connected at their tips to the drive blades 14 of the adjacent turbine units 10. The drive torque provided by drive shaft 31 is thus only transmitted by drive shaft portions 12 and drive blades 14 do not receive unwanted torsion torques from the adjacent turbine units 10.

As shown in FIG. 2, each turbine unit 10 is angularly shifted around axis D with respect to an adjacent turbine unit. This provides a drive torque, at the end of drive shaft 31 of turbine column 30 connected to the electric generator, which is substantially uniform all along a 360° rotation of turbine column 30. The shift is, for example, by 360/(P*N) degrees for a turbine column 30 having a stacking of N turbine units 10, with each turbine unit 10 having P drive blades 14. Further, such shifts provide an asymmetrical structure which eases the rotating of turbine column 30 from a stopped position.

In operation, a lift force having a direction perpendicular to axis D and perpendicular to the flow direction and having its exact direction depending on the rotation direction of turbine unit 10 results from the liquid flow around a turbine unit 10. The lift force adds to the drag force which is systematically present. Drive shaft 31 is thus submitted to a general non-zero lift force, corresponding to the sum of the lift forces associated with each turbine unit 10. This may be undesirable for certain applications. To overcome such a disadvantage, some turbine units 10 are connected to drive shaft 31 each via a torque reversal system enabling turbine unit 10 to rotate around axis D in the direction opposite to the rotation direction of drive shaft 31. Turbine units 10 may be distributed across turbine column 30 so that two adjacent turbine units 10 rotate in an opposite direction. More generally, turbine column 30 may be formed of a succession of groups of adjacent turbine units 10, each comprising a small number of adjacent turbine units 10. All the turbine units 10 in a same group then rotate in the same direction and the turbine units 10 of two successive groups rotate in opposite directions. The previously-described structures are advantageous since the total lift force applied to turbine column 30, corresponding to the sum of the lift forces associated with each turbine unit 10, can then be substantially decreased, or even suppressed.

For each turbine unit 10, a gearbox or any other speed variation system enabling modifying the ratio between the rotation speed of drive shaft portion 12 and the rotation speed of drive blades 14 may be provided between hub 18 and the associated drive shaft portion 12. The speed ratio may be modified according to the current flow rate which reaches the considered turbine unit 10. This is advantageous given that, according to sites, the flow of the marine or river current may vary both along time and/or according to the considered turbine unit 10 along rotation axis D. Now, for a given turbine unit 10, the maximum supplied power is obtained for a rotation speed of drive blades 14 which depends on the current flow rate which reaches turbine unit 10. The installing of such a speed variation system at the level of each turbine unit 10 enables operating each turbine unit 10 of a column 30 so that it provides a maximum power. According to a variation, the speed variation system may be associated, rather than with one turbine unit 10, with a group of adjacent turbine units. According to another variation, for a column 30 formed of turbine units 10 having drive blades 14 moving along with drive shaft 12, a single speed variation system is provided to control along time the rotation speed of drive shaft 12, which is identical in this case to the rotation speed of all the drive blades. Generally, drive shaft 12 is connected to the input shaft of a generator. The speed variation system is then arranged between drive shaft 12 and the input shaft of the generator and is capable of modifying the ratio between the rotation speed of the drive shaft and the rotation speed of the input shaft of the generator so that column 30 provides a maximum power. As an example, the connection between drive shaft 12 and the input shaft of the generator may be formed at the upper end, at the lower end, or at any point along the axis of drive shaft 12 via a transmitter system. The speed variation system can then, according to cases, be arranged at the upper or lower end of the drive shaft, or at any point along the axis of drive shaft 12. The control of the speed ratio set by the speed variation system may be performed according to a measurement of the upstream velocity of the marine or river current which reaches column 30 or directly from an analysis of the power supplied by column 30. According to another variation, the generator provides a braking torque which opposes to the rotation of column 30 and which has an amplitude that can be controlled so that the rotation speed of column 30 corresponds to the speed at which the maximum power is supplied.

Figure 3:
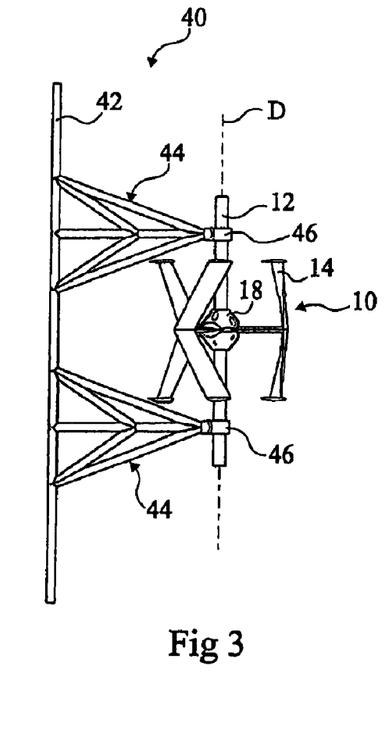
FIG. 3 is a front view of a first embodiment of an element of the holding device according to the present invention.

FIG. 3 shows a first embodiment of a structure unit 40 ensuring the holding of a turbine unit 10. Structure unit 40 comprises a post 42 oriented along axis D and linking means 44 connecting post 42 to bearings 46 arranged on either side of hub 18 of turbine unit 10 and in which drive shaft portion 12 of turbine unit 10 is rotatably mounted. Direction D generally corresponding to the vertical direction, post 42 will be called a vertical post hereafter. Vertical post 42 may be a hollow beam with a circular cross-section or shaped as a wing profile. Linking means 44 generally extend along a direction perpendicular to axis D, and comprise, in the present embodiment, an assembly of beams arranged in a lattice.

Figure 4:
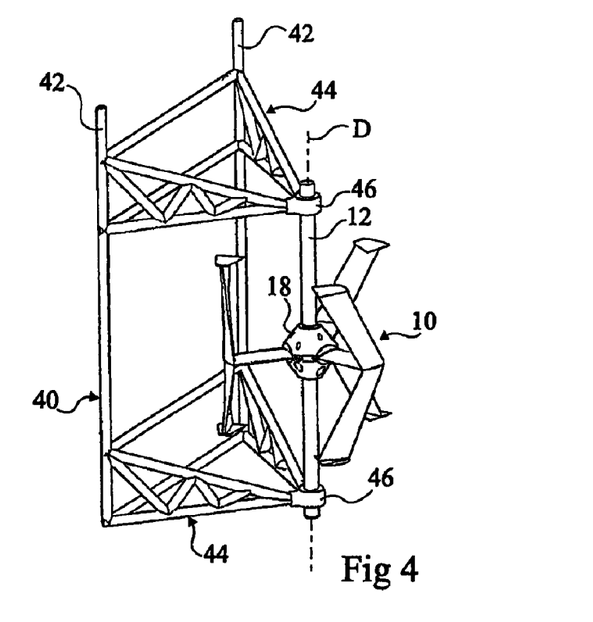
FIG. 4 is a perspective view of a second embodiment of an element of the holding device according to the present invention.

FIG. 4 shows a second embodiment in which structure unit 40 comprises two vertical posts 42 connected by linking means 44 to two bearings 46 receiving drive shaft portion 12 of turbine unit 10 on either side of hub 18. Linking means 44 are formed of beams arranged in a lattice and comprise beams 48 which connect vertical posts 42 to each other to stiffen structure unit 40.

For the first and second embodiments, structure units 44 are advantageously arranged in operation in the marine or river current downstream of turbine unit 10 along the current flow direction. They thus enable positioning the associated turbine unit 10 in an upstream region without forming an obstacle for the current.

Figure 5A:
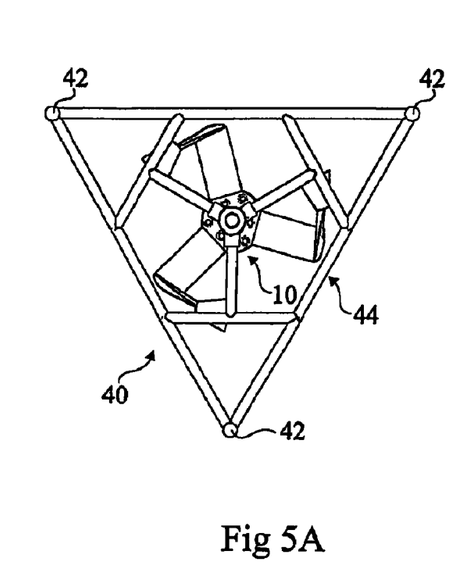
FIGS. 5A and 5B are respectively a top view and a perspective view of a third embodiment of an element of the holding device according to the present invention.
Figure 5B:
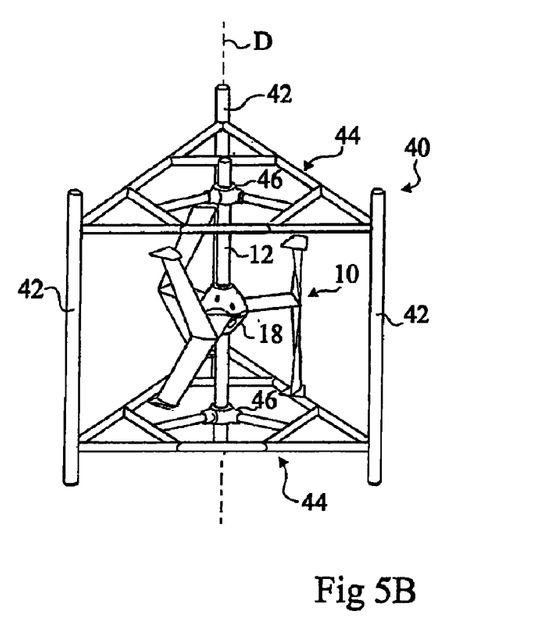

FIGS. 5A and 5B show a third embodiment in which structure unit 40 comprises three vertical posts 42 arranged, as seen from above, at the apices of a triangle, for example, an equilateral triangle. Vertical posts 42 are connected by linking means 44 to two bearings 46 receiving drive shaft portion 12 of turbine unit 10 on either side of hub 18. Linking means 44 are formed of beams arranged in a lattice which also connect posts 42 to one another to stiffen structure unit 40.

Figure 6:
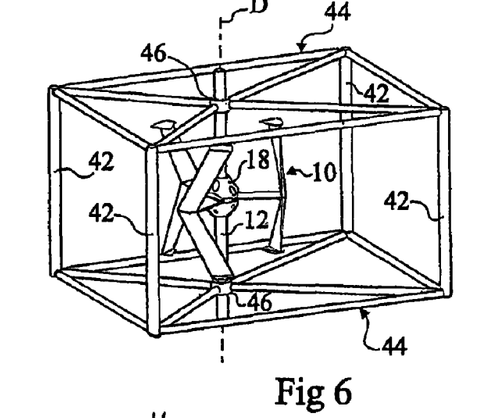
FIG. 6 is a perspective view of a fourth embodiment of an element of the holding device according to the present invention.

FIG. 6 shows a fourth embodiment in which structure unit 40 comprises four vertical posts 42 arranged, as seen from above, at the apices of a rectangle. Vertical posts 42 are connected by linking means 44 to two bearings 46 receiving drive shaft portion 12 of turbine unit 10 on either side of hub 18. Linking means 44 are formed of beams arranged in a lattice which also connect posts 42 to one another to stiffen structure unit 40.

Figure 7:
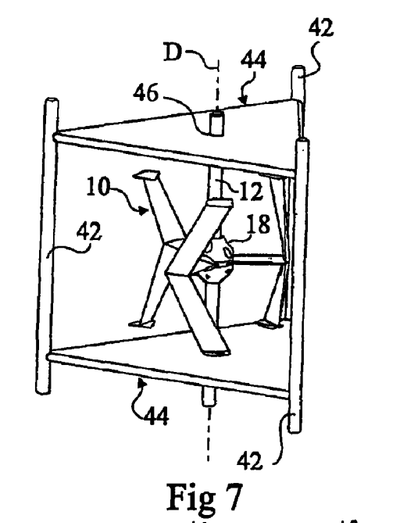
FIG. 7 is a perspective view of a fifth embodiment of an element of the holding device according to the present invention.

FIG. 7 shows a fifth embodiment in which structure unit 40 comprises three vertical posts 42 arranged, as seen from above, at the apices of a triangle, for example, an equilateral triangle. Vertical posts 42 are connected by linking means 44 to two bearings 46 receiving drive shaft portion 12 of turbine unit 10 on either side of hub 18. Linking means 44 are formed of two plates arranged on either side of turbine unit 10 in a plane substantially perpendicular to axis D, each connecting the three vertical posts 42 to one of bearings 46.

For the embodiments shown in FIGS. 5A, 5B, 6, and 7, some vertical posts 42 are arranged in the marine or river current upstream of turbine unit 10 along the current flow direction. Vertical posts 42 upstream of the turbine unit are arranged with respect to turbine unit 10 and with respect to one another to limit as much as possible they obstructing the current. In the last three embodiments, it is possible to attach a grating at the level of the vertical posts 42 located upstream of turbine unit 10 to protect turbine unit 10 against solids which would risk damaging blades 14 of turbine unit 10.

In the previously-described embodiments, the beams forming vertical posts 42 or linking means 44 are shown with a circular cross-section. It should however be clear that each beam or some beams may have a hollow or solid cross-section, with a contour corresponding to a wing profile, for example, a NACA-type profile, especially to minimize the drag due to the current while increasing the stiffness in flexure.

Figure 8:
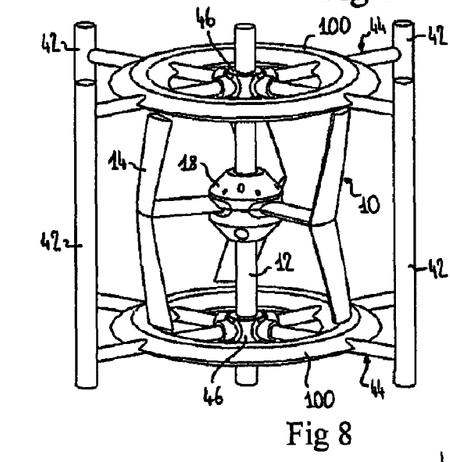
FIG. 8 is a perspective view of a sixth embodiment of an element of the holding device according to the present invention.

FIG. 8 is a perspective view of a sixth embodiment of an element of the holding device according to the present invention in which structure unit 40 comprises four vertical posts 42 arranged, as seen from above, at the apices of a rectangle. Vertical posts 42 are connected by linking means 44 to two bearings 46 receiving the drive shaft portion 12 of turbine units 10 on either side of hub 18. Linking means 44 are formed of beams in a lattice which cross structural rings 100, called fixed circular deflectors 100, in the horizontal current direction. The axis of rings 100 corresponds to the axis of turbine unit 10. The rings fulfil several functions. They help stiffening structure unit 40. They also help decreasing wing tip vortices and thus enable using a turbine unit 10 having blades with not winglets. Indeed, rings 100 behave as a deflector for the upstream incident flow at the level of the layers reaching the ends of the turbines, this flow being divided into two flows, one directed towards the upper turbine unit, the other being directed towards the lower turbine unit with respect to ring 100, both flows having a respectively ascending and descending velocity component parallel to axis D. Such a local redirection opposes to and annihilates secondary flows along blades 14 which tend to escape towards the tips and to supply wing tip vortices. This phenomenon occurs in areas where the blades are in driving situation, that is, upstream of the structure unit or again downstream of said unit.

Figure 9A:
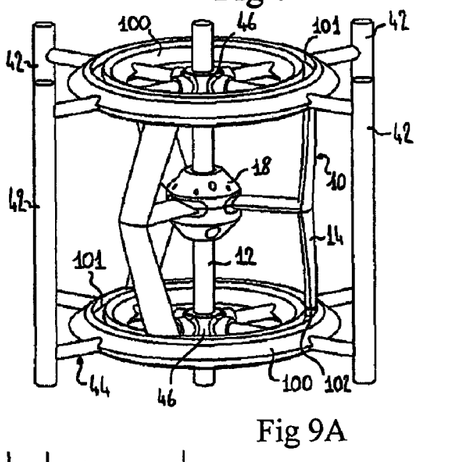
FIGS. 9A and 9B respectively are a perspective view and a detail view of a seventh embodiment of an element of the holding device according to the present invention.
Figure 9B:
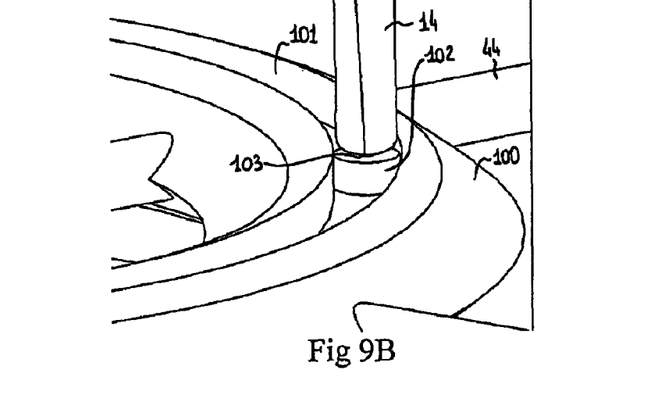

FIGS. 9A and 9B show a seventh embodiment of an element of the holding device according to the present invention in which, as compared with the sixth embodiment, ring 100 fulfils the additional function of guiding the tip of blades 14 and of fighting against the blade flexure. For this purpose, a groove 101 is formed on the upper and lower surfaces of ring 100. Each drive blade 14 comprises at each end a roller 102, or a free wheel, which is housed in groove 101 of the adjacent ring 100. As shown in FIG. 9B, free wheel 102 has the shape of a cylindrical portion assembled to freely rotate around a shaft 103 attached to blade 14. The wheel axis is oriented along the rotation axis of turbine unit 10. The lateral wall of wheel 102 is likely to come into contact with the walls of groove 101.

Figure 10:
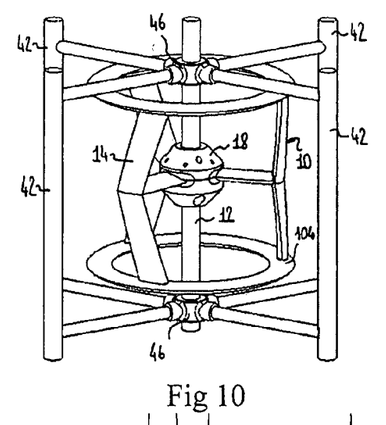
FIG. 10 is a perspective view of an eighth embodiment of an element of the holding device according to the present invention.

FIG. 10 is a perspective view of an eighth embodiment of an element of a holding device, in which a ring 104 is directly connected to the ends of blades 14. Such an embodiment enables limiting the flexure stress on blades 14 while avoiding use of the friction roller system shown in FIG. 9B.

Figure 11A:
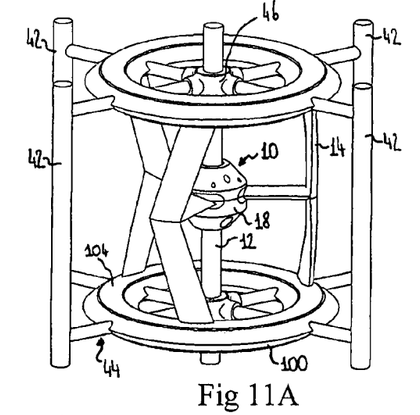
FIGS. 11A, 11B and 11C respectively are a perspective view and two detail views of a ninth embodiment of an element of the holding device according to the present invention.
Figure 11B:
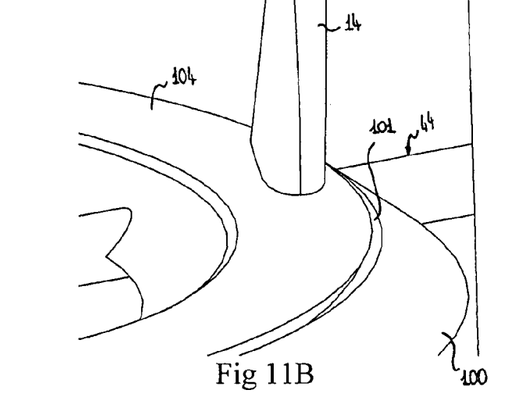
Figure 11C:
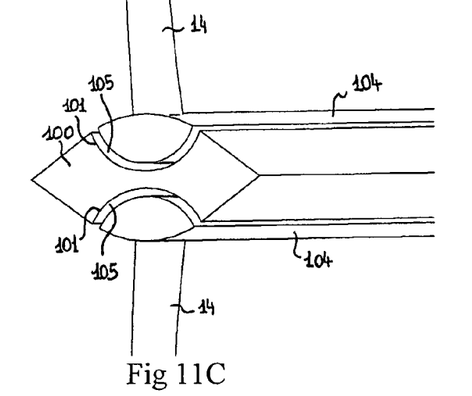

FIGS. 11A, 11B, and 11C show a ninth embodiment of the holding device according to the present invention in which, as compared with the eighth embodiment shown in FIG. 10, rotating ring 104 is attached to the tips of blades 14 and is housed in groove 101 of fixed ring 100. A cross-section of the general profile thus obtained in shown in FIG. 1C. The surface of rotating ring 104 opposite to groove 101 comes in prolongation of the external surface of ring 100. A clearance 105 provided between rings 100 and 104 ensures a frictionless relative rotating motion since there is no contact between rings 100 and 104.

Figure 12:
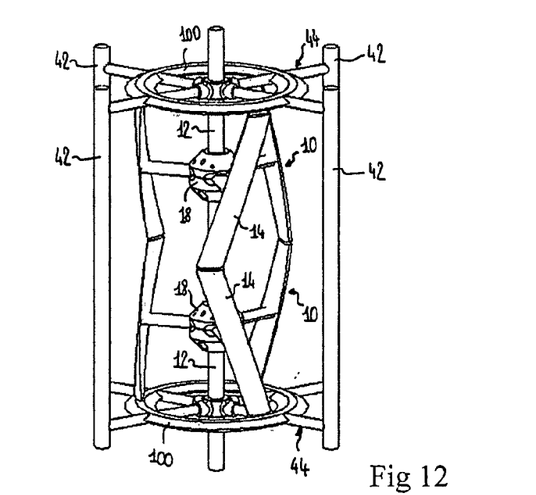
FIG. 12 is a perspective view of a tenth embodiment of an element of the holding device according to the present invention.

FIG. 12 is a perspective view of a tenth embodiment of the holding device according to the present invention in which the element of the holding device is associated with a group of turbines comprising, as shown in FIG. 12, two successive turbine units 10. However, the group of turbines may comprise more than two turbine units 10. Linking means 44 connecting lateral posts 42 to a bearing 46 are provided on either side of the group formed by the two turbine units 10. As an example, linking means 44 have the same structure as the linking means of the sixth embodiment of a holding device element shown in FIG. 8. However, linking means 44 may have the same structure as the linking means of any embodiment of the holding device element shown in FIGS. 3 to 11C. As shown in FIG. 12, each blade 14 of a turbine unit 10 corresponds to an oblique wing, the inclinations of blades 14 of a turbine unit 10 with respect to the rotation axis of turbine unit 10 being substantially identical. The inclination of the blades 14 of a turbine unit 10 is opposite to the inclination of blades 14 of the adjacent turbine unit 10 and the turbine units 10 are arranged so that each blade 14 of a turbine unit is substantially in prolongation of a blade of the adjacent turbine unit. Each blade of a turbine unit then forms with an adjacent turbine unit blade a V-shaped wing.

Figure 13:
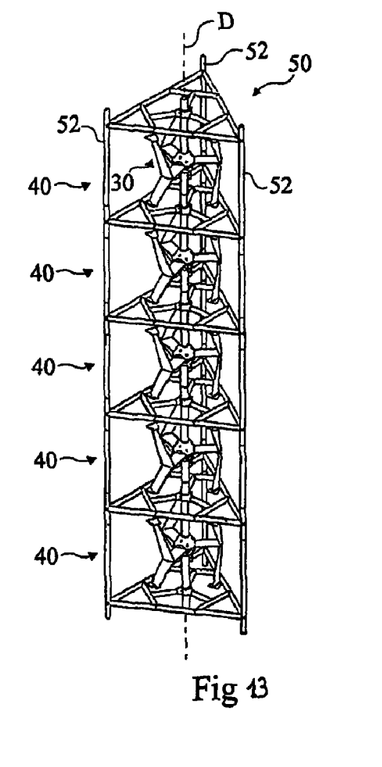
FIGS. 13 and 14 are examples of devices for holding in position a turbomachine respectively formed with the elements of the holding device according to the third and ninth embodiments.
Figure 14:
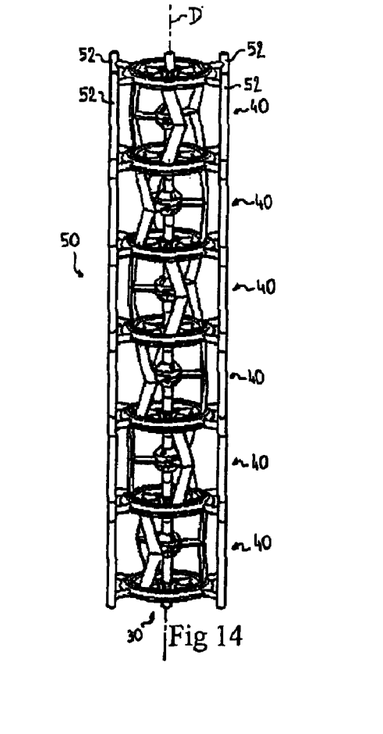

FIGS. 13 and 14 show two examples of the forming of a tower 50 for holding a turbine column 30 in position. Each tower 50 is formed of a stacking of structure units 40 according to the present invention. As an example, in FIG. 13, tower 50 is formed of the stacking of five structure units according to the third embodiment and, in FIG. 14, tower 50 is formed of the stacking of six structure units according to the sixth embodiment. Each structure unit 40 is connected to the adjacent structure units. Structure units 40 are thus held from close to close up to the end structure units. In operation, turbine column 30 rotates around rotation axis D while tower 50 formed of the stacking of structure units 40 is fixed. Towers 50, shown in FIGS. 13 and 14, respectively comprise three and four vertical posts 52, each formed of the stacking of vertical posts 42 of structure units 40. It should be noted that the linking means 44 connecting a bearing to the vertical posts are common to two adjacent structure units 40. The structure unit located at the upper end of tower 50 may be connected to a barge, to floats, or held by cables anchored to the ground. The structure unit located at the lower end of tower 50 may be connected to the floor via anchorages. The anchorages may be individual for each tower 50. However, in the case where several towers 50 are provided next to one another, a collective anchorage, of false floor type, may be provided, to which are attached all the lower-end structure units of towers 50.

According to the present invention, the stiffening of drive shaft portion 12 of each turbine unit 10 is ensured by the associated structure unit 40. Thereby, the holding of turbine column 30 is not ensured by the tensioning of drive shaft 31 by the application of axial forces to the ends of drive shaft 31 or to the ends of a cable which would run through drive shaft 31, but by structure units 40. When a guide cable running through drive shaft 31 is however present, it may keep a guiding function in operations of assembly/disassembly of turbine units 10. However, to perform such a guiding function, for at least one vertical post 52 of tower 50, a cable or the like element running through vertical post 52 may be provided instead of a cable running through drive shaft 31. The assembly or the disassembly of a structure unit 40 is then obtained by sliding structure unit 40 along the guide cable.

For operations of assembly and disassembly of a tower 50 and of the associated turbine column 30, it may be provided for a structure unit 40 to be firmly attached to the associated turbine unit 10. The assembly and disassembly of a tower 50 and of the associated turbine column 30 can then be performed by structure unit—turbine unit pairs or by sets of structure unit—turbine unit pairs. The assembly and disassembly are eased by providing guiding elements housed in the vertical posts of the structure units instead of guiding elements housed in drive shaft 31.

On first installation of a tower 50 and of the associated turbine column 30, in the case where a false floor attached to the ground at the level of which the lower-end structure unit of tower 50 must be attached and a floating barge or an immersed platform at the level of which the upper-end unit of tower 50 must be attached are used, guiding systems previously attached to the false floor and to the floating barge or the immersed platform may be provided, enabling easy positioning of the structure unit—turbine unit pairs. Such guiding systems may be taken advantage of in subsequent maintenance operations.

Tower 50 as a whole ensures a function of stiffening of the associated turbine column 30 which is necessary, in particular, against flexure deformations resulting from the drag force exerted on turbine column 30 by the marine or river current. It is thus no longer necessary to apply axial forces to the ends of drive shaft 31 of turbine column 30. Tower 50 also ensures a guiding function when a structure unit—turbine unit pair or an assembly of structure unit—turbine unit pairs is brought up or down.

FIGS. 15 to 18 show different examples of systems for attaching a tower 50. These different examples all provide a linking system 60 ensuring in all cases a rigid connection along at least one direction parallel to the upstream current direction, this via the lower end of tower 50 or a vertical portion oriented along the direction of posts 42. Linking system 60 may comprise ball joints, annular joints, sliding hinge type joints or clampings.

Figure 15:
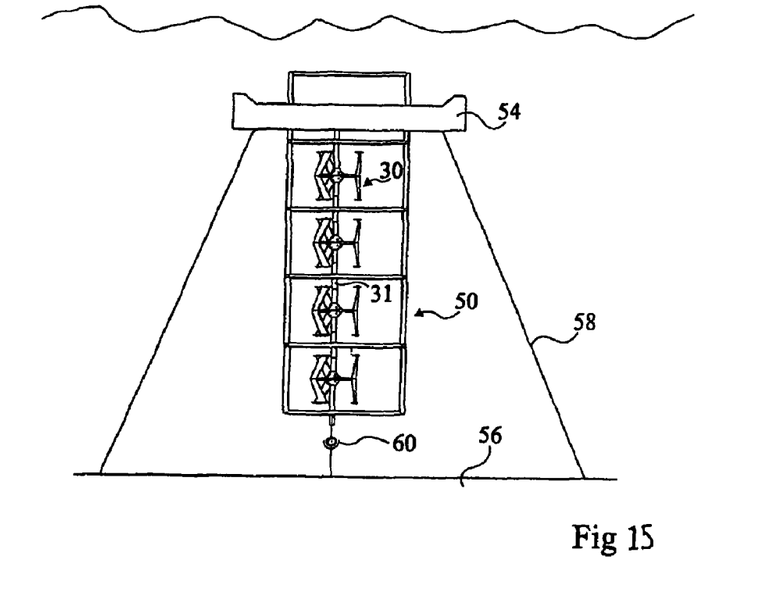
FIGS. 15 to 18 show examples of systems for attaching the holding device according to the present invention.

FIG. 15 shows an example of a system for attaching a tower 50 in which the upper end of tower 50 is attached to an immersed holding platform 54. Platform 54 is linked to ground 56 via cables 58. The lower end of tower 50 is attached to ground 56 via a ball joint 60 providing a rigid hold along a translation axis parallel to the current direction, ball joint 60 being attached to the ground via individual or collective anchorage systems ensuring a fixed position of the lower end of ball joint 60. A liquid layer is thus left between the upper end of tower 50 and the surface. The obtained structure is thus less sensitive to the swell (especially to the surface level oscillation and to the impact of waves). It is however desirable for the depth of the liquid layer overhanging tower 50 not to be too large (for example, smaller than some twenty meters) to avoid making the access to tower 50 and to turbine column 30 too difficult. According to a variation, it may be envisaged that the water depth variations results in that the upper end of tower 50 is above the water surface at certain periods. According to another variation, a totally emerged additional platform, not shown, linked to immersed platform 54, is associated with said immersed platform 54. This enables keeping out of the water certain service systems and especially an electric generator, for which a prolonged immersion may be a problem. A system for transmitting the drive torque provided by drive shaft 31 of turbine column 30 to the electric generator may be provided at the emerged platform.

The embodiment shown in FIG. 15 is defined with respect to specific operating conditions and maintenance conditions. According to a variation, the lower end of tower 50 may be connected by clamping to ground 56 or to a false floor. Further, cables 58, holding the upper end of tower 50, may be replaced with rigid structural shapes. The presence or not of immersed platform 54 is conditioned by the search for the most favorable conditions for the general behavior of tower 50 in operation and for the easiest possible ergonomy for the operations performed during the maintenance.

Figure 16:
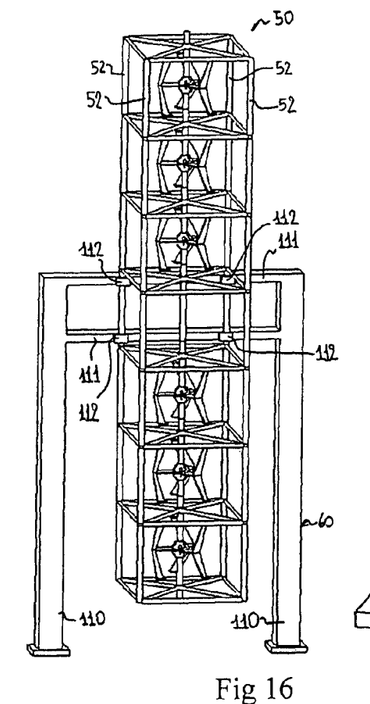

FIG. 16 shows an example of a system 60 for attaching a tower 50 comprising two pylons 110, each pylon 110 being attached at a lower end to the ground and the upper ends of pylons 110 being interconnected by crossbars 111. Posts 52 of tower 50 are attached to crossbars 111 by fasteners 112. Tower 50 is attached to the attachment system substantially at its middle.

Figure 17:
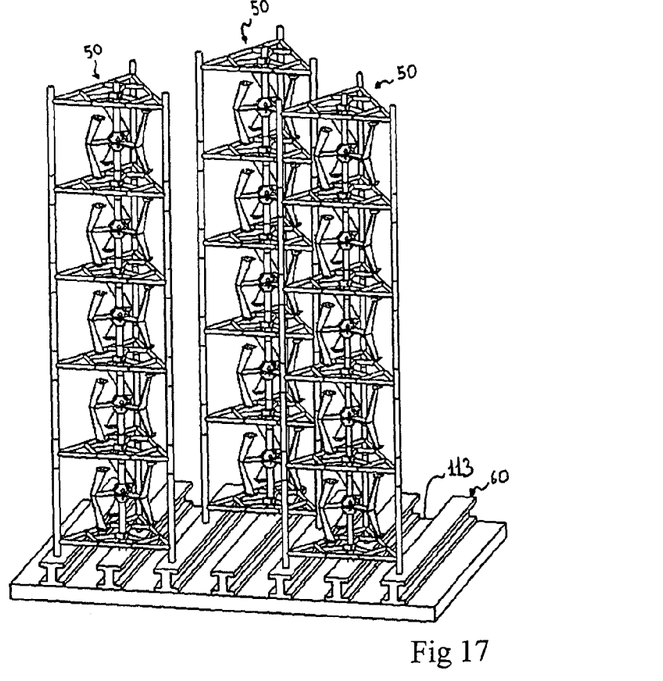

FIG. 17 shows an example of a system 60 for attaching a tower 50 comprising a collective anchorage 113, of false floor type, to which the lower ends of several towers 50 can be attached. Such a type of anchorage 113 is particularly advantageous for the implantation of groups of towers 50 on uneven bottoms.

Figure 18:
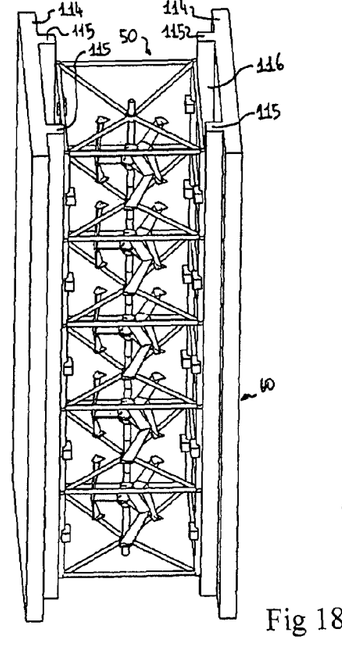

FIG. 18 shows an example of a system 60 for attaching a tower 50 comprising two walls 114 arranged on either side of a tower 50. Each wall 114 is attached at its base to the floor. On each wall 114 are distributed two parallel protruding portions 115 which define a channel 116. Each channel receives a portion of tower 50 and thus holds it in its position.

Figure 19:
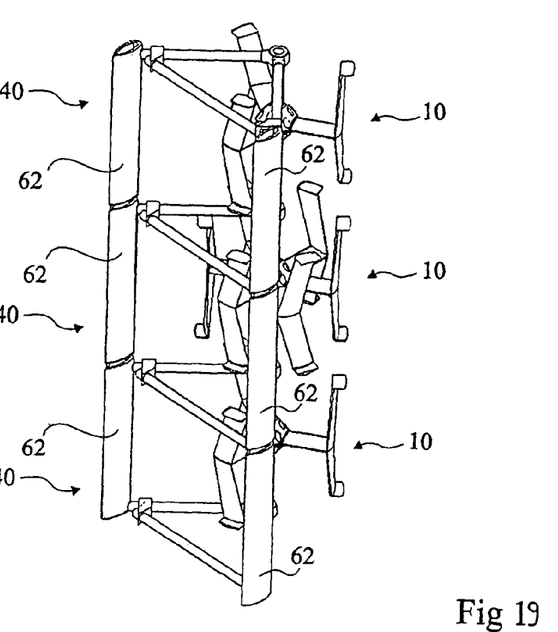
FIG. 19 is an eleventh embodiment of an element of the holding device according to the present invention.

FIG. 19 shows an eleventh embodiment of structure unit 40. According to such an embodiment, structure unit 40 has substantially the same general shape as the second embodiment of the structure unit according to the present invention. However, an additional stiffening element 62, formed by a sleeve which surrounds the vertical post, is provided at the level of each vertical post 42 of structure unit 40. The profile of each post may be a NACA-type profile to minimize the drag due to the marine or river current. Such sleeves may also be provided directly at the level of the drive shaft portions 12 of each turbine unit 10.

Figure 20A:
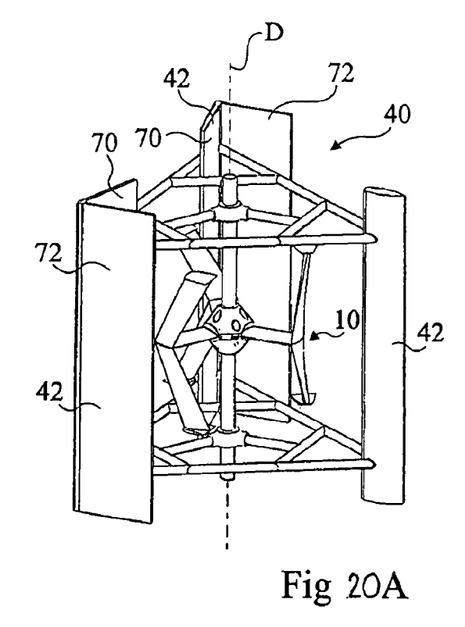
FIGS. 20A and 20B are a perspective view and a top view of a twelfth embodiment of an element of the holding device according to the present invention.
Figure 20B:
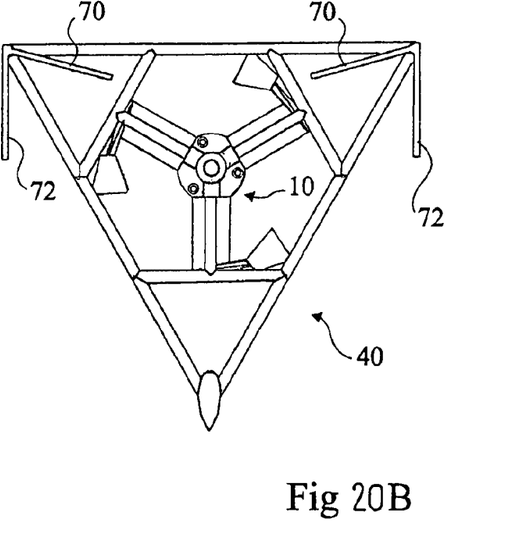

FIGS. 20A and 20B show a twelfth embodiment of structure unit 40, in which the general shape of the structure unit substantially corresponds to the shape of the third embodiment of the structure unit according to the present invention. According to the twelfth embodiment, the two vertical posts 42 of structure unit 40, located upstream of turbine unit 10 along the current flow direction, correspond to a beam with a "V"-shaped cross-section, in a plane perpendicular to axis D, with one branch 70 oriented towards turbine unit 10 and with its other branch 72 substantially oriented along a direction slightly inclined with respect to the current flow direction as it is drawn away from turbine unit 10. Branches 70 of the upstream vertical posts enable channeling the current towards turbine unit 10. Branches 72 of the upstream vertical posts, which may advantageously be prolonged with planar walls parallel to the upstream flow, enable avoiding for eddy currents to reach turbine unit 10. Further, vertical post 42 of structure unit 40, located downstream of turbine unit 10 with respect to the current flow direction, has a cross-section shaped as a wing profile, enabling limiting the drag and stabilizing structure unit 40. Branches 70 of upstream vertical posts 42 enable directing the current to the regions crossed by drive blades 14 of turbine unit 10 where turbine unit 10 is the most efficient in operation. Indeed, during a same rotation, each drive blade 14 of turbine unit 10 provides a drive torque to the drive shaft portion 12 of turbine unit 10 which strongly varies according to the angular position of drive blade 14 with respect to axis D and which may even be negative when drive blade 14 is at the level of the lateral regions of turbine unit 10 with respect to the current flow direction. It is thus necessary to privilege the downstream region and especially the upstream region of turbine unit 10 with respect to the current flow direction. Branches 70 of upstream vertical posts 42 thus have the function of making the liquid flow converge towards such privileged areas. Further, branches 70 of upstream vertical posts 42 enable increasing the velocity of the flow which reaches turbine units 10, which enables increasing its efficiency. Advantage may also be taken of branches 70 to stiffen vertical posts 42.

Figure 21:
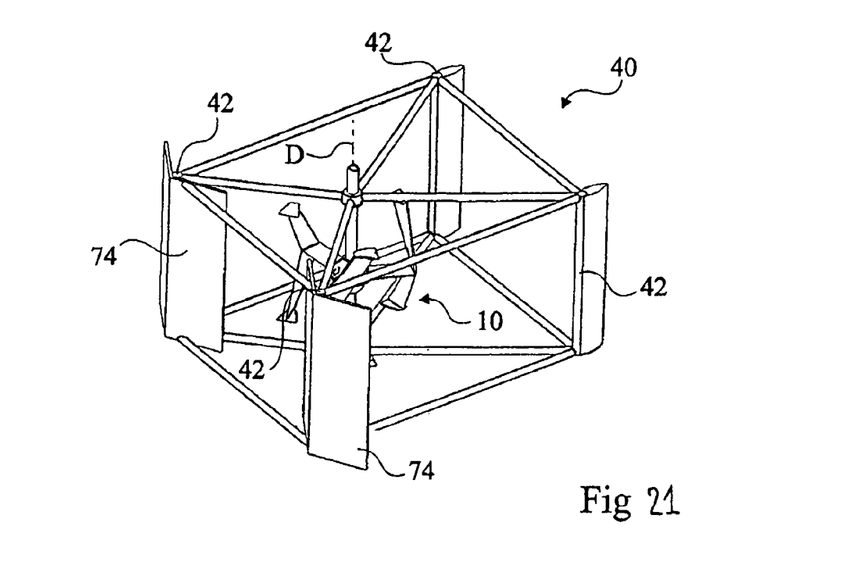
FIG. 21 is a perspective view of a thirteenth embodiment of an element of the holding device according to the present invention.

FIG. 21 shows a thirteenth embodiment of structure unit 40 in which the general shape of the structure unit substantially corresponds to the shape of the fourth embodiment of the structure unit according to the present invention. The addition at the level of each vertical post 42, located upstream of turbine unit 10 with respect to the marine or river current flow direction, of a conditioning device 74 having a "V"-shaped cross-section in a plane perpendicular to axis D, is provided. In the present embodiment, conditioning devices 74 are attached to upstream vertical posts 42 while in the previously-described embodiment, the upstream vertical posts directly ensure the current-conditioning function.

Figure 22:
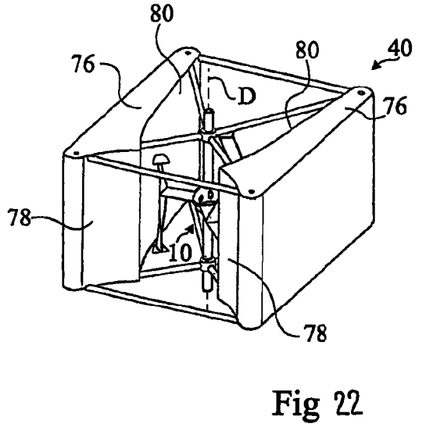
FIG. 22 is a perspective view of a fourteenth embodiment of an element of the holding device according to the present invention.

FIG. 22 shows a fourteenth embodiment of structure unit 40 in which the general shape of the structure unit substantially corresponds to the shape of the fourth embodiment of the structure unit according to the present invention. Between each upstream vertical post of turbine unit 10 along the marine or river current flow direction and the downstream vertical post located in prolongation of the upstream vertical post along the current flow direction, a conditioning device 76 in the form of a hollow or solid enclosure is provided. Each conditioning device 76 comprises, on the side of turbine unit 10, a lateral convergent wall 78 which starts at the level of the upstream vertical level and prolongs in a lateral divergent wall 80 down to the downstream vertical post. Such a conditioning device 76 can provide an inlet section for the flow having an area equal to or different from the area of the outlet section. According to a variation, lateral divergent wall 80 has its trailing edge provided between the upstream vertical post and the associated downstream vertical post. When the two conditioning devices 76 are installed at the level of structure unit 40, lateral convergent walls 78 strongly confine the flow towards turbine unit 10 according to a principle similar to that previously described in relation with FIGS. 20A, 20B, and 21. Lateral divergent walls 80 enable letting the flow coming out from turbine unit 10 expand to compensate for the pressure drop between upstream and downstream induced by turbine unit 10. Each conditioning device 76 may be, if it is hollow, at least partially filled with water. According to a variation, a remotely-operable system is provided, which enables, in operation, at least partially filling conditioning device 76 with surrounding water and/or at least partially emptying conditioning device 76.

Figure 23:
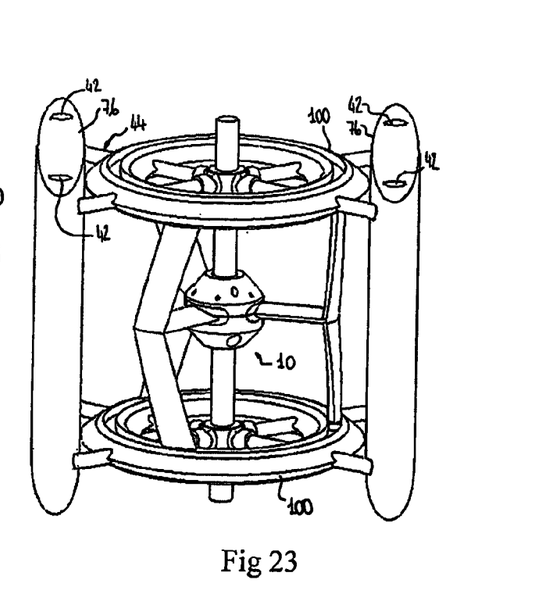
FIG. 23 is a variation of the element of the holding device of FIG. 9.

FIG. 23 shows a variation of conditioning device 76, described for the seventh embodiment of a holding device element. The specificity of conditioning device 76 is an axial symmetry in the conditioning device cross-section. This cross-sectional symmetry has the advantage of allowing for a high-performance hydrodynamic conditioning for an upstream fluid current likely to change directions along time, as is the case in a marine current context, for example.

Figure 24:
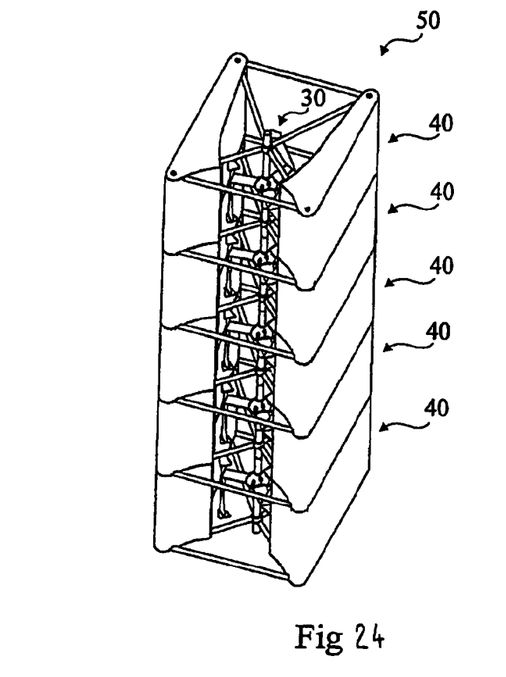
FIGS. 24 and 25 show examples of devices for holding in position a turbomachine formed with the elements of the holding device according to the thirteenth and fourteenth embodiments.

FIG. 24 shows an example of a tower 50 with the associated turbine column 30, formed of structure units 40 corresponding to the structure unit of FIG. 22.

Figure 25:
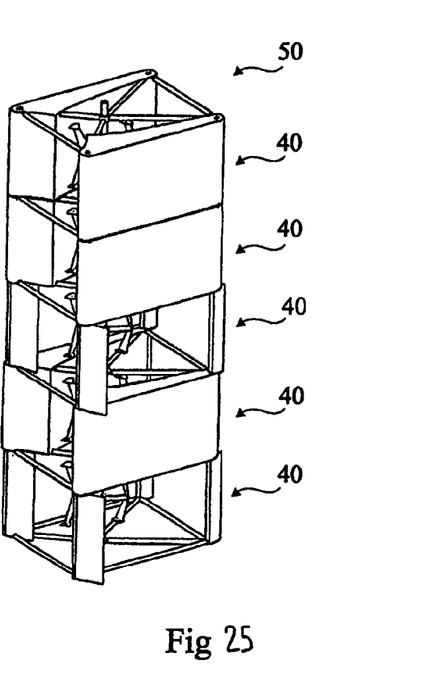

FIG. 25 shows an example of a tower 50 with the associated turbine column 30, formed of a stacking of structure units 40 corresponding to the structure unit of FIG. 21 and to the structure unit of FIG. 22.

Conditioning devices 76 enable protecting a tower 50 against collisions with other adjacent towers, especially in assembly or disassembly operations. Further, for each structure unit 40 comprising two conditioning devices 76, the conditioning devices 76 may impose on tower 50 a general axial force along axis D, oriented downwards or upwards according to the filling level of conditioning devices 76. As an example, in the case where the water level contained in conditioning devices 76 can be modified while tower 50 is immersed in the marine or river current, conditioning devices 76 may be emptied when a maintenance operation is desired to be performed to ease the disassembly of tower 50. Conversely, conditioning devices 76 may be filled up with water in an assembly operation to ease the installation of the structure units. In the transportation of tower 50 to the place of installation or on return of tower 50 for a ground maintenance, conditioning devices 76 may be emptied so that the tower assembly floats at the surface, axis D having during such operations of transportation of tower 50 a horizontal direction, tower 50 as a whole being for example towed by a ship. The advantages of conditioning devices 76 are significant altogether for the transportation, the installation, the maintenance and the removal of towers 50.

Figure 26:
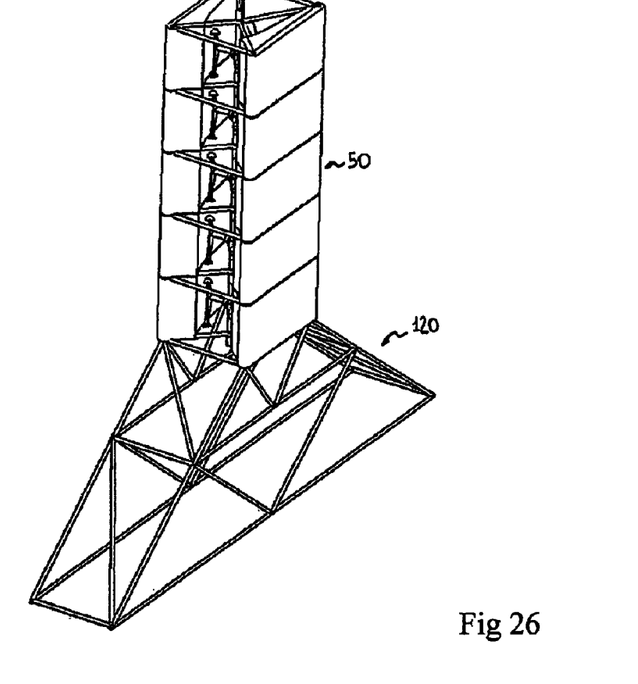
FIG. 26 shows a variation of the holding device of FIG. 24.

FIG. 26 shows a variation of tower 50 of FIG. 24 in which a bearer structure 115, for example, pyramid-shaped, formed of beams arranged in a lattice, is provided at the lower end of tower 50. Bearer structure 115 provides a better seat for tower 50 on the ground or on a false floor, by increase in the contact surface area.

Figure 27:
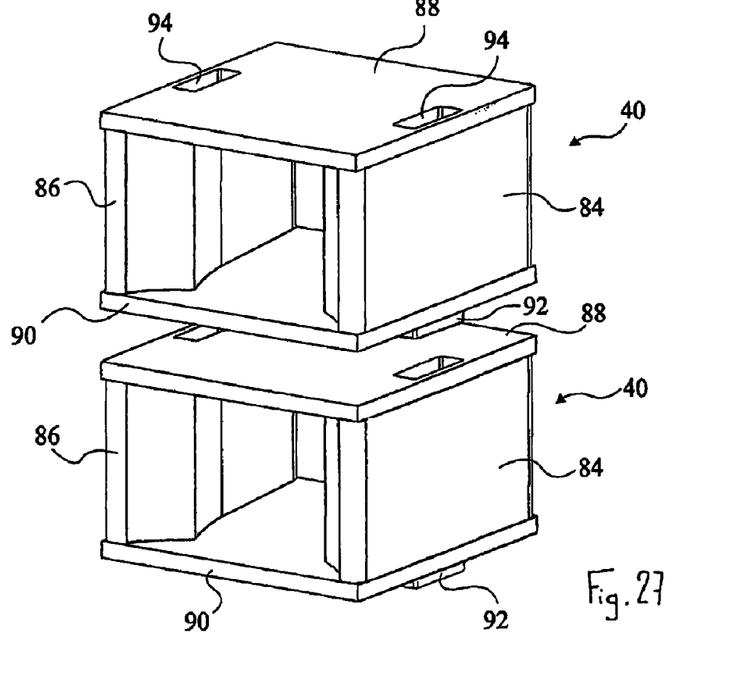
FIG. 27 is a perspective view of a fifteenth embodiment of two elements of the holding device according to the present invention.

FIG. 27 shows a fifteenth embodiment of a structure unit 40 in which structure unit 40 is formed of two enclosures 84, 86 connected by an upper plate 88 and a lower plate 90, each comprising a bearing, not shown, receiving the drive shaft portion of a turbine unit, not shown. Each enclosure 84, 86 directly acts as a post 42 such as described in the previous embodiments. The stress induced by the immersion of turbine unit 10 in a marine or river current, especially the flexure stress induced by the drag forces applied to turbine unit 10, is taken by enclosures 84, 86. Further, enclosures 84, 86 may fulfil the same function as conditioning devices 76 of the ninth embodiment of the present invention. Pins 92 may be provided at the level of lower plate 90 and recesses 94 may be provided at the level of upper plate 88, where pins 92 of the lower plate 90 of a structure unit 40 are capable of cooperating with recesses 94 of the upper plate 88 of the adjacent structure unit 40 to improve the behavior under mechanical stress of tower 50 in operation while enabling positioning structure units 40 with respect to one another on assembly of tower 50. Cables may run through each enclosure 84, 86, for example, at the level of pins 92 and of recesses 94 to ease the tower assembly and disassembly. Attachment systems, not shown, may be added to ensure the cohesion along the direction of rotation axis D between two adjacent structure units 40. According to a variation, structure unit 40 may comprise a single plate (the upper or lower plate).

The structure units according to the embodiments described in relation with FIGS. 20A to 27 comprise marine or river current conditioning devices 74, 76 which are defined with respect to a well-defined orientation of the current. To keep the specific advantage of a hydraulic turbomachine with a vertical axis, which is its insensitivity to the direction of the current, a rotation of tower 50 with respect to axis D, possibly controlled by the power recovered from the upper immersed or emerged platform, may be allowed, the connection between the lower end unit of tower 50 and the false floor or the ground enabling rotation of tower 50. Means for forcing the orientation of tower 50 according to the current direction may then be provided, or it may also be provided for tower 50 to automatically orient according to the current direction.

According to a variation of the previously-described embodiments, a same structure unit may be associated with a stacking of several turbine units. In this case, the vertical post or the vertical posts of the structure unit are connected to a first bearing receiving the drive shaft portion of the turbine unit located at the upper end of the stacking of turbine units and to a second bearing receiving the drive shaft portion of the turbine unit located at the lower end of the stacking of turbine units. Such a structure unit may be formed according any of the previously-described embodiments.

Of course, the present invention is likely to have various alterations and modifications which will occur to those skilled in the art. In particular, a same turbine column may comprise turbine units of different structures. Further, for the embodiments described in relation with FIGS. 3 to 12, posts 42 may have more complex shapes than those which have been shown. In particular, the posts 42 of each structure unit may correspond to beams arranged to zigzag, to form a cross, etc. Further, tower 50 may have a general truncated pyramid shape, with the lower end structure unit of the tower having greater dimensions than the upper end structure unit. The posts of each structure unit may then be arranged, in a plane containing rotation axis D, to be inclined with respect to axis D. Further, although the present invention has been described for isolated towers, the present invention also applies to a turbomachine formed of several interconnected adjacent towers, where the structure units of adjacent towers may have common elements. Moreover, although the present invention has been described for a hydraulic turbomachine used to supply electricity, it also applies to turbomachines for which the mechanical energy provided by the machine drive shaft may be used for other purposes, for example, for a pumping system, a water desalination system, etc.

The invention claimed is:

1. A device for holding a hydraulic turbomachine in position, the turbomachine comprising a drive shaft along which are distributed turbines designed to rotate the drive shaft when they are immersed in a moving liquid, each turbine comprising drive blades distributed around the drive shaft, the device comprising:

at least three posts extending along at least more than half of the length of the drive shaft, each post being formed of the stacking of at least two post portions, each post portion being associated with a turbine or with an assembly of adjacent turbines, at least two posts being designed to be arranged upstream of the turbomachine along the liquid flow direction and on either side of a plane containing the axis of the drive shaft and the liquid flow direction;

first linking means attached to one of the post portions and to a bearing receiving the drive shaft and arranged between two adjacent turbines; and second linking means connecting at least one of the posts to the ground by a rigid connection with respect to the ground along at least one axis parallel to the liquid motion direction;

said device comprising at the level of each post portion among two post portions of said two posts arranged upstream of the turbomachine, associated with a same turbine or with a same assembly of adjacent turbines, a conditioning device attached to said post portion or integrated with said post portion of each of said two posts and capable of directing the liquid flow towards the turbomachine, said conditioning devices being symmetrical with respect to the liquid flow direction.

2. The device of claim 1, in which the first linking means extend along a general direction perpendicular to the axis of the drive shaft.

3. The device of claim 1, comprising, for each pair of adjacent turbines, first linking means attached to a post portion, associated with at least one of the turbines of the pair of adjacent turbines, and to a bearing receiving the drive shaft between the turbines of the pair of adjacent turbines.

4. The device of claim 1, comprising at least two posts oriented along the axis of the drive shaft, each formed of the stacking of at least two post portions, each post portion being associated with a turbine or with an assembly of adjacent turbines, the linking means being attached to post portions of said two posts, associated with the same turbine or with the same assembly of adjacent turbines, and to said bearing.

5. The device of claim 1, in which at least one post portion is surrounded with a stiffening sleeve having, in a plane perpendicular to the axis of the drive shaft, a wing profile to limit the drag.

6. The device of claim 1, comprising guiding means running through the post, each post portion being capable of sliding along the guiding means in an operation of assembly or disassembly of the device.

7. The device of claim 1, comprising a grating attached between two post portions of said two posts associated with a same turbine or with a same assembly of adjacent turbines.

8. The device of claim 1, comprising means for modifying the position of the posts with respect to the turbomachine according to the liquid flow direction.

9. The device of claim 1, comprising a speed variation system between a turbine, or a turbine assembly, and the drive shaft capable of modifying the ratio between the rotation speed of the turbine or of the turbine assembly and the rotation speed of the drive shaft according to the liquid flow which reaches the turbine or the turbine assembly.

10. The device of claim 1, in which the drive shaft drives an input shaft of an energy conversion system, the device comprising a speed variation system capable of modifying the ratio between the rotation speed of the drive shaft and the rotation speed of the input shaft according to the liquid flow which reaches the turbomachine.

11. The device of claim 1, in which the drive shaft drives an input shaft of an energy conversion system, the energy conversion system being capable of providing a braking torque, which opposes to the rotation of the drive shaft, of an amplitude determined according to the liquid flow which reaches the turbomachine.

12. The device of claim 1, in which the ends of the blades of at least one of the turbines are interconnected by a stiffening element which is fixed with respect to the turbine.

13. The device of claim 1, comprising a platform to which is attached the upper end of each post along the direction of the axis of the drive shaft.

14. The device of claim 13, in which the platform is immersed in the liquid.

15. The device of claim 1, comprising at least one hollow tank, attached to at least one post portion, said tank being empty or at least partly filled with liquid.

16. The device of claim 15, comprising remotely-operable means capable, when the tank is immersed in the liquid, of at least partially filling the tank with liquid and/or of at least partially emptying the tank.

17. The device of claim 1, comprising at least one ring-shaped stiffening element attached to the first linking means at the tips of the blades of one of the turbines.

18. The device of claim 17, in which the stiffening element comprises a ring-shaped groove and in which at least one blade of a turbine comprises an element capable of sliding in said groove.

19. The device of claim 17, in which the stiffening element comprises a ring-shaped groove and in which the ends of the blades of at least one of the turbines are interconnected by an additional ring-shaped stiffening element which is fixed with respect to the turbine and arranged at the groove level.

* * * * *